UNITED STATES PATENT OFFICE.

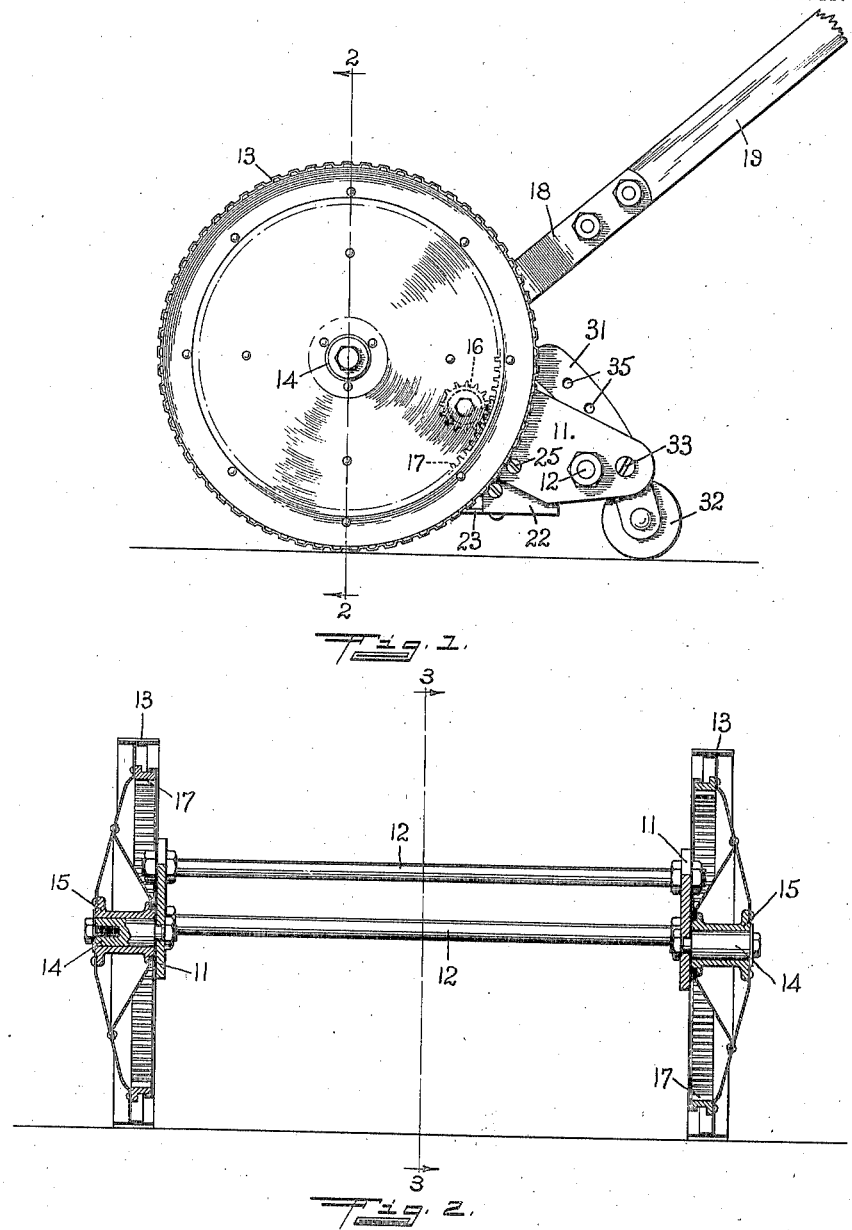

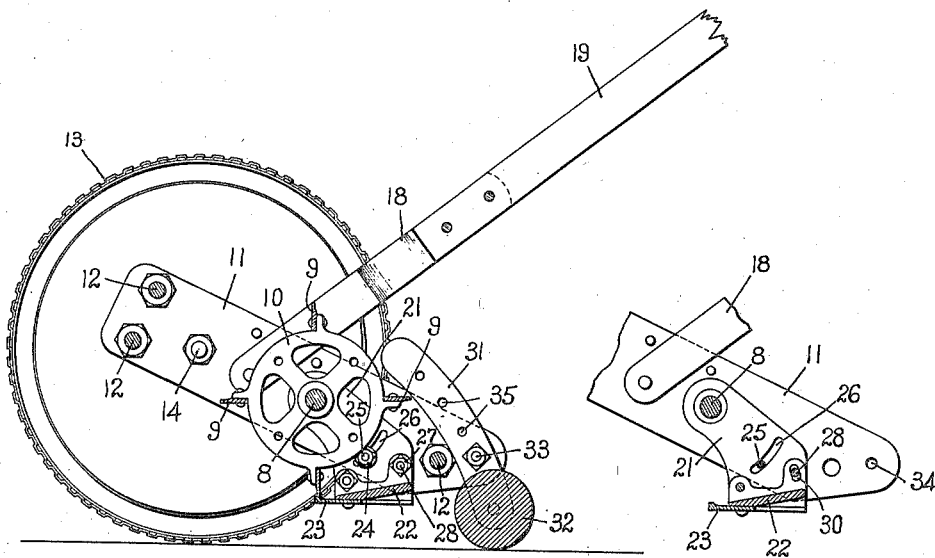
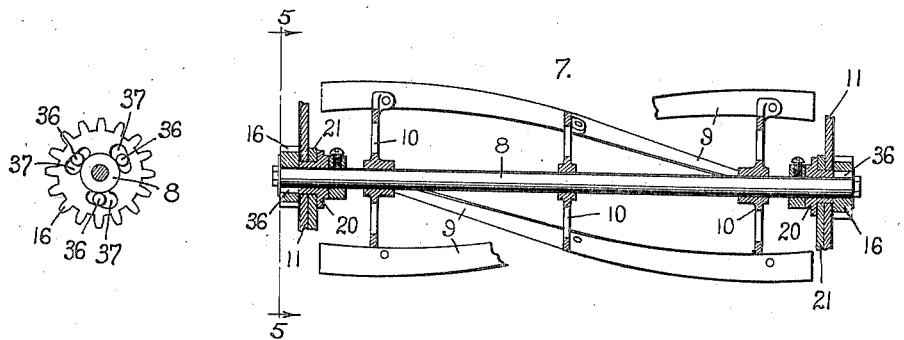

FINIS H. McLAIN, OF UNIVERSITY PLACE, NEBRASKA.

LAWN-MOWER.

1,315,977.   Specification of Letters Patent.   Patented Sept. 16, 1919.

Application filed April 11, 1918. Serial No. 227,858.

*To all whom it may concern:*

Be it known that I, FINIS H. McLAIN, a citizen of the United States, residing at University Place, in the county of Lancaster and State of Nebraska, have invented certain new and useful Improvements in Lawn-Mowers, and have described the same in the following specification, illustrated by the accompanying drawings.

My invention relates to that class of lawn mowing machines which are commonly driven by hand and which individually comprise a shearing cutter-blade and a reel, which is actuated by the bearing wheels of the machine and which has revolving knives coacting with the cutter blade. It is the main object of the invention to increase the range of adjustability of machines of this class; thereby to adapt a single machine, by different adjustments, to cut the standing grass at widely different heights above the soil, as may be requisite or preferred at different times or places; to cut the grass at all times in swaths of a uniform depth or thickness, regardless of the height of the cut above the ground; to cut the grass at different levels with equal expenditures of power; to actuate the reel shaft from the bearing wheels through intermediate mechanisms operatively connecting the shaft in a special manner with both wheels or with either of them alone as the movements of the machine may require; to attain simplicity of construction of the lawn mower; and in general to increase the efficiency of mowing machines of the specified class. To accomplish these results, I incorporate in my improved lawn mower, as parts thereof, a pair of cutter-bar hangers which are rotarily adjustable on the reel shaft and which carry the cutter blade constantly in a position directly under the reel shaft.

In the accompanying drawings, illustrating the best manner in which I have contemplated applying the principles of the invention, Figure 1 is a side elevation of a lawn mower, which is constructed in accordance with these principles. Fig. 2 is a vertical section on the section line 2—2 of Fig. 1. Fig. 3 is a vertical section on the section line 3—3 of Fig. 2. Fig. 4 is a detail including a vertical section of the cutter blade and a portion of its supports. Fig. 5 is an enlarged detail vertical section on the section line 5—5 of Fig. 6. Fig. 6 is an axial section of the knife-carrying reel.

In the illustrated specimen of my invention, the reel, denoted generally by the numeral 7, is a rotatable cutter of a well known type. It comprises the rotatable shaft 8, the four duplicate spaced peripheral knives 9, and the spaced spiders 10 whereby the knives are secured to the shaft with their cutting edges uniformly equi-distant from its axis. This shaft is journaled in bushings 20 in a rigid frame comprising the side arms 11 united by the several brace rods 12, and has the stub axles 14 turning in the hubs 15 of the bearing wheels having the tires 13. The same shaft carries the terminal pinions 16 meshing respectively with the internal gears 17 which form parts of these wheels. Each of these pinions contains a plurality of bearing rollers 36 which are disposed in axial parallelism with the shaft 8 in the cross-sectionally tapering recesses 37 formed in the containing pinion. When the machine is traveling in a straight course, these rollers roll operatively to the narrow ends of these recesses, where they lock both pinions to the reel shaft. When the machine is much deflected from that course, the rollers in the recesses of the slowly moving or stationary pinion are moved into the opposite and wider ends thereof with the result that the shaft is unlocked from this pinion and driven independently by the other and more active pinion. To the side arms 11 respectively are rigidly attached the opposite ends of the ball 18 to which is secured the mower handle 19. Between the side arms 11, and laterally contiguous thereto respectively, the two hangers 21 are pivotally suspended from the same shaft 8 by the same bushings 20. These hangers, being duplicate and parallel plates, adjustable by pivotal oscillation in their respective vertical planes, are rigidly connected with each other by the adjustable transverse cutter bar 22, which carries the adjustable cutter blade 23 in close and co-operative proximity to the revolving knives 9. Relatively to the side arms 11, the hangers 21 are adjustable by using the clamping nuts 24 on the pins 25 in the slots 26; while the cutter bar 22 is likewise adjustable relatively to the hangers by using the clamping nuts 27 on the bolts 28 in the slots 30. Likewise the extensions 31, which are affixed to the side arms 11 respectively, and in which is journaled the ground roller 32, are adjustable to a greater or less extension, as occasion may require, by means of the clamp bolts 33, which are inserted through the boltholes 34 and selectively through the boltholes 35.

I claim as my invention—

1. A lawn mower of the specified class, comprising a pair of bearing wheels having internal gear teeth; a frame having side arms with axles journaled in the hubs of the bearing wheels; a rotating cutter having a shaft journaled in the side arms; pinions carried by the shaft and meshing with the internal gear of the bearing wheels; a pair of rotatively adjustable hangers dependent from the reel shaft; and a cutter blade carried by the hangers in a position to coact with the rotating cutter; the cutter blade being positioned under the reel shaft and vertically adjustable in unison therewith; whereby the mower may be made to cut either near the ground or at a predetermined height above the ground, as may be desired.

2. A lawn mower of the specified class, comprising bearing wheels having concentric internal gears respectively; a pair of side arms rigidly connected together and having an axle journaled in the hubs of the bearing wheels; a rotating cutter mounted between the side arms; one-way pinions mounted on the cutter shaft and meshing with the internal gears respectively; a pair of hangers dependent from the cutter shaft and adjustable up and down in unison with the reel shaft; a cutter blade carried by the hangers; and a ground roller connected with the side arms.

3. A lawn mower of the specified class, comprising a pair of bearing wheels; a rigid frame having an axle journaled in the hubs of the wheels and having side arms; a knife-carrying reel having a shaft journaled in the side arms and actuated rotatively by the bearing wheels; a pair of hangers carried by the shaft; a cutter carried by the hangers and hung directly under the reel shaft; a ground roller connected with the side arms; and a handle connected with the side arms.

4. A lawn mower of the specified class, comprising a pair of bearing wheels; a rigid frame having a handle and an axle which is journaled in the wheel hubs; a rotating cutter having a shaft journaled in the frame; rotative means connecting the wheels with the cutter shaft; a pair of hangers dependent from the shaft and adjustably secured to the frame; a cutter carried by the hangers and adjustable to one and the same angular position relatively to the rotating cutter in all positions of the latter; and a ground roller carried by the frame.

5. A lawn mower of the specified class, comprising a pair of bearing wheels; a rigid frame having a handle and an axle which is journaled in the wheels; a rotatable cutter having a shaft journaled back of the axle in the frame; gearing between the wheels and the shaft; a pair of hangers having bearings on the shaft; an adjustable connection between the hangers and the frame; a cutter carried by the hangers and vertically adjustable in unison with the reel shaft; adjustable arm extensions carried by the frame; and a roller carried by the arm extensions.

6. In a lawn mower of the specified class, a reel shaft having terminal pinions rotatable thereon, a cutter blade positioned under the reel shaft and vertically adjustable in unison therewith, means for driving the pinions independently of each other, and a plurality of bearing rollers adapted to lock each pinion to the shaft.

Witness my signature at Omaha, Nebraska, April 6th, 1918.

FINIS H. McLAIN.